United States Patent

Wuethrich

[11] Patent Number: 5,562,273
[45] Date of Patent: * Oct. 8, 1996

[54] PLUG-IN COUPLING FOR PRESSURE LINES

[75] Inventor: Albrecht Wuethrich, Wolhusen, Switzerland

[73] Assignee: Han Oetiker AG Maschinen- & Apparatefabrik, Switzerland

[*] Notice: The portion of the term of this patent subsequent to Jul. 5, 2011, has been disclaimed.

[21] Appl. No.: 190,038

[22] PCT Filed: Jun. 2, 1993

[86] PCT No.: PCT/CH93/00142

§ 371 Date: Jan. 28, 1994

§ 102(e) Date: Jan. 28, 1994

[87] PCT Pub. No.: WO93/24781

PCT Pub. Date: Sep. 12, 1993

Related U.S. Application Data

[63] Continuation-in-part of Ser. No. 896,092, Jun. 8, 1992, Pat. No. 5,326,072, which is a continuation-in-part of Ser. No. 423,394, Sep. 27, 1989, abandoned.

[30] Foreign Application Priority Data

Jun. 3, 1992 [CH] Switzerland .................... 1807/92

[51] Int. Cl.$^6$ ...................................................... F16L 37/28
[52] U.S. Cl. ...................... 251/149.2; 251/149.9; 137/616.7
[58] Field of Search ............................ 251/149.2, 149.9, 251/149.6, 208; 137/616.7

[56] References Cited

U.S. PATENT DOCUMENTS 2,015,396  9/1935  Drissner.
2,493,271  1/1950  Smith et al..
3,474,827  10/1969  Torres ............................ 251/149.6 X
4,662,396  5/1987  Avnon.
5,326,072  7/1994  Wuthrich ............................ 251/149.2

FOREIGN PATENT DOCUMENTS 0327494  8/1989  European Pat. Off..
2028653  10/1970  France.
2068039  8/1971  France.
3843995  6/1990  Germany.
9013145  1/1991  Germany.
638959  6/1950  United Kingdom.
1503647  3/1978  United Kingdom.

Primary Examiner—Martin P. Schwadron
Assistant Examiner—Kevin L. Lee
Attorney, Agent, or Firm—Speckman, Pauley & Fejer

[57] ABSTRACT

A pluggable coupling for pressure lines having a female coupling connector and a male coupling connector. The female coupling connector has two axially aligned connecting bores with different diameters and an annular groove formed between a wall surrounding the larger bore and a nipple surrounding the smaller bore. The male connector can be inserted into the larger bore of the female coupling connector. In the process, the male coupling connector is pushed over the nipple. A sealing element is positioned within a circular male coupling groove of the male coupling connector and sealingly encloses a smooth exterior surface of the nipple. The male coupling connector can be connected and disconnected from the female coupling connector with a relatively small amount of force as compared to the force required to connect and disconnect conventional couplings.

14 Claims, 3 Drawing Sheets

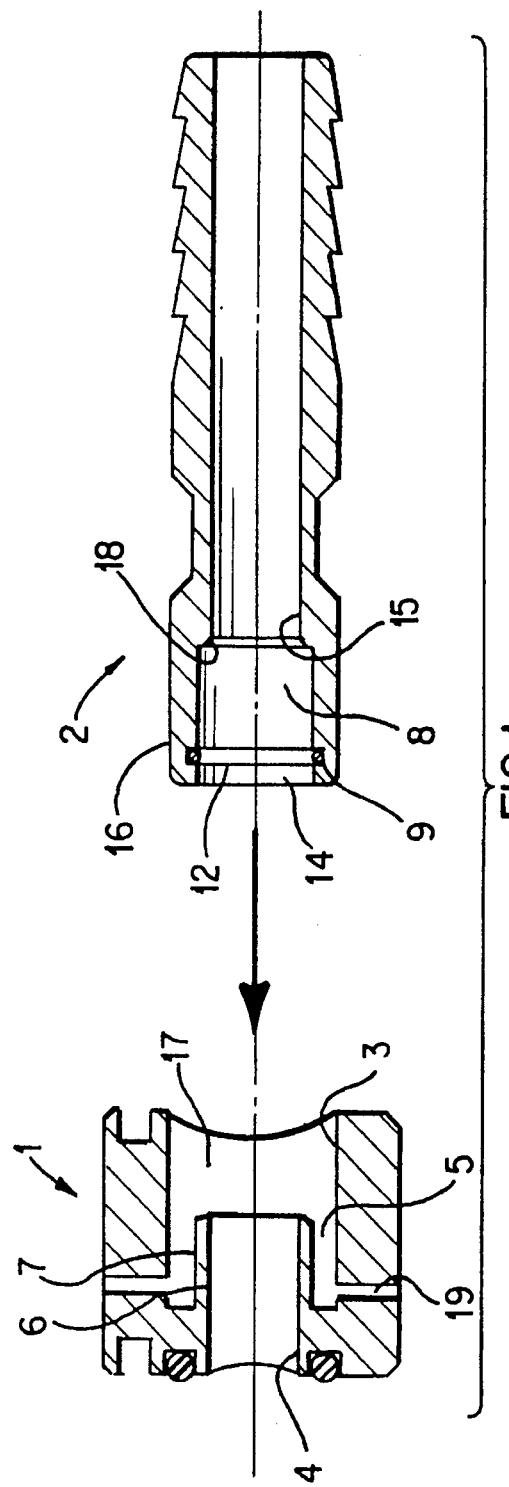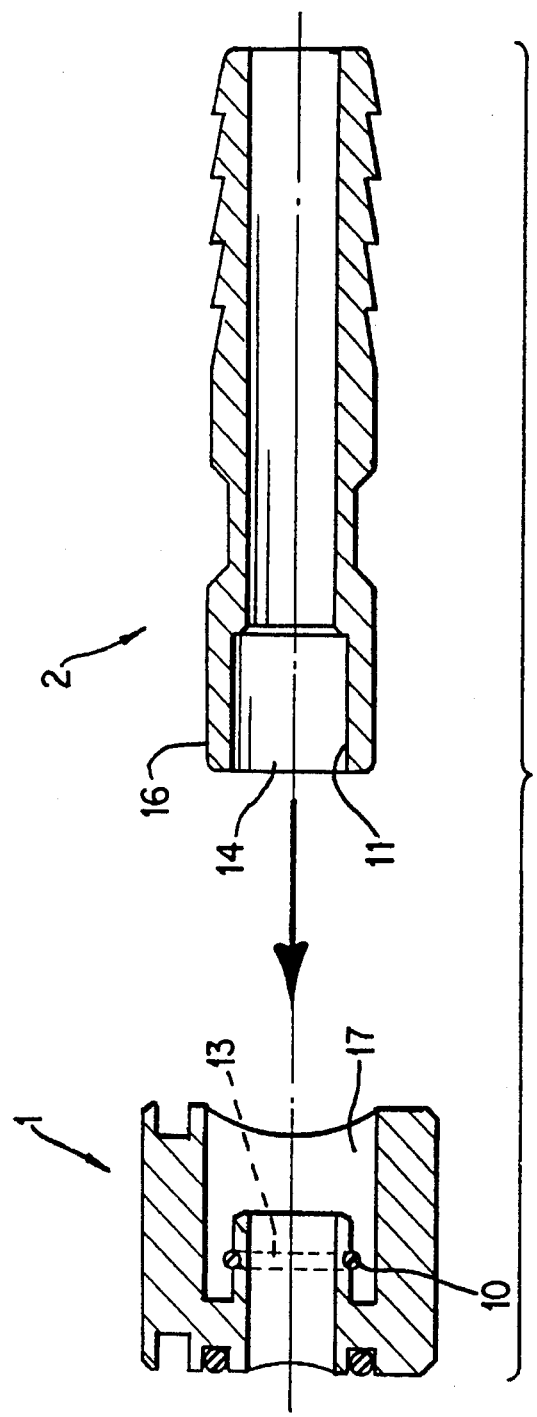

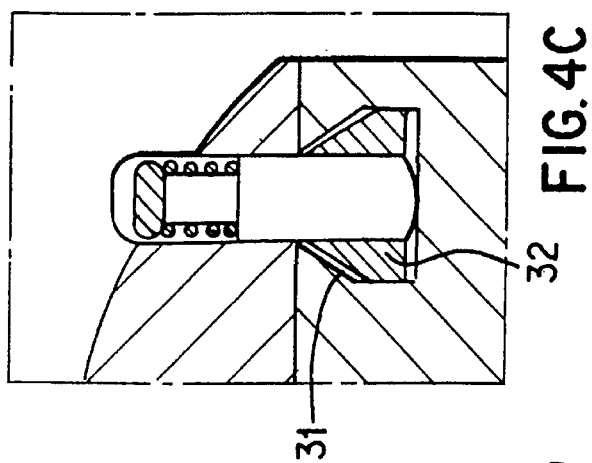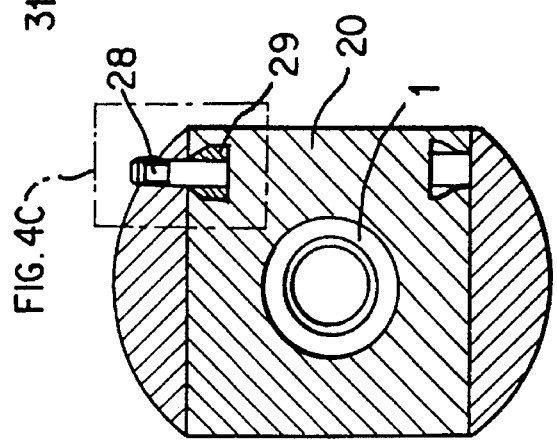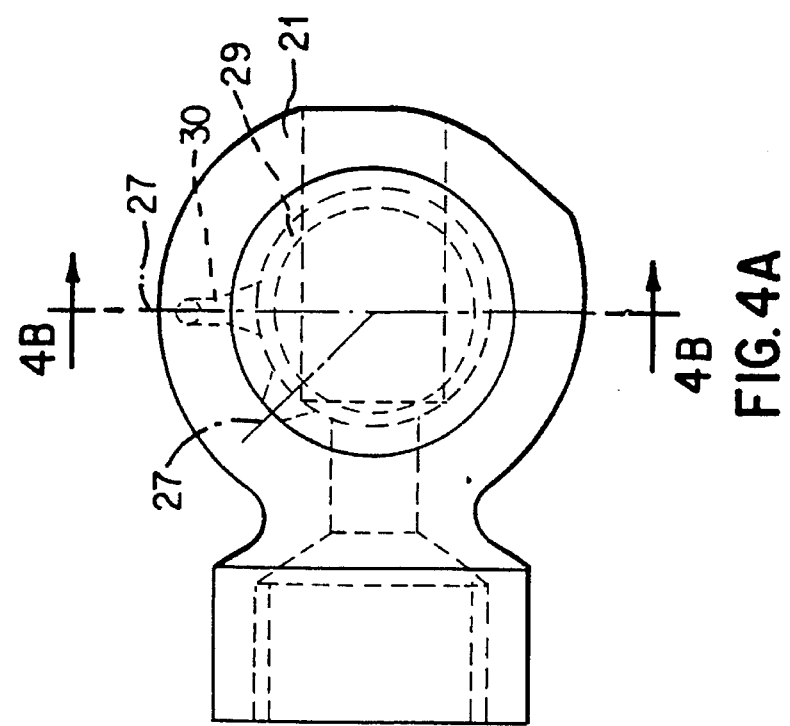

PLUG-IN COUPLING FOR PRESSURE LINES

This is a continuation-in-part patent application of my co-pending patent application having Ser. No. 07/896,092, filed Jun. 8, 1992, Pat. No. 5,326,072, which is a continuation-in-part of my abandoned patent application having Ser. No. 07/423,394, filed Sep. 27, 1989.

BACKGROUND OF THE INVENTION

1. Field of the Invention

This invention relates to a pluggable coupling for connecting pressure lines carrying compressible as well as incompressible fluids, comprising a female coupling connector and a male coupling connector.

2. Description of Prior Art

Conventional linear couplings for pressure lines have, in general, a male coupling connector and a female coupling connector, a locking mechanism which keeps the female connector and the male connector together, and a blocking device which prevents fluid under pressure from flowing out or escaping when the coupling is disconnected. To make a connection, in most conventional couplings, the male coupling connector is inserted into the female coupling connector and the male connector is fixed in the female connector by a locking system. When the male coupling connector is inserted into the female connector, the blocking device of the coupling is opened and the fluid is allowed to flow through the coupling. If the coupling is disconnected, the flow is interrupted again. Accordingly, it is necessary, during coupling and locking as well as when disconnecting such a coupling, to push the male connector in the direction of the female connector. The force necessary for this depends on the pressure in the pressure line and the effective cross-sectional surface of the coupling. The effective cross-sectional surface consists of the inner cross-sectional surface of the male connector or the female connector and of the annular cross-sectional surface of the male connector or the female connector on which the fluid under pressure acts when the blocking device of the coupling is opened. With high pressure, a large expenditure of force is required to insert the male connector into the female connector and to lock it or, in the locked position, to remove the male coupling connector from the female coupling connector. In most cases, the coupling or uncoupling operation cannot be performed with one hand because of the large expenditure of force required and because it is necessary to press the male coupling connector against the female coupling connector and simultaneously operate the locking mechanism.

In contrast to conventional linear couplings, conventional pivotable couplings use a pivotable blocking member as a female coupling connector which also blocks the flow in the uncoupled state. The male coupling connector is inserted without any pressure forces acting on it at an oblique angle to the pressure line into the blocking member which is pivotably seated in a coupling housing. The pressure line is still interrupted after this insertion. By pivoting the male coupling connector and the blocking member in the interior of the coupling housing, the coupling is straightened out to allow fluid to flow through the coupling. As soon as the male connector is straightened out, the blocking member is secured against pivoting because the male connector is pushed back in the female connector by pressure in the pressure line into a recess in the coupling housing. In this way the coupling is locked. This process of coupling and locking can take place with a relatively small amount of force because it is only necessary to overcome the frictional forces acting on the blocking member when the blocking member is pivoted. However, uncoupling requires a comparatively large amount of force. To unlock the blocking member it is first necessary to push the male connector out of the recess in the coupling housing toward the female coupling connector. The force required for this depends on the pressure in the pressure line which may be considerable. When the blocking member of the coupling is pivoted, the blocking member blocks the flow until the male coupling connector passes over a relief bore in the coupling housing. The pressure difference between the pressure in the interior of the male coupling connector to be removed and the atmosphere pressure is reduced in this pivoted position. Then the blocking member is pivoted further so that the male connector can be removed without being under pressure out of the female connector.

With both of the above mentioned types of couplings—namely the linear coupling as well as the coupling having a pivotable blocking member, the seal between the female coupling connector and the male coupling connector is positioned in the female connector and the exterior of the male connector has a sealing face, or the interior of the female connector has a sealing face and the seal is located on the exterior of the male connector. These structures are disadvantageous because the sealing face or the seal of the coupling can be easily damaged because they are outwardly facing. In actual use the male coupling connector is, in most cases, mounted on a loose hose end. If the male coupling connector is not connected, the sealing face can easily be damaged and rapidly becomes dirty. Male coupling connectors which lie on the ground unprotected are damaged, for example, by vehicles rolling over them, by dragging the hose on the ground and other effects on the sealing faces. This results in increased waste and rapid wear of the coupling parts. If the sealing face or the seal are damaged, the coupling becomes leaky and the defective coupling part must be replaced.

SUMMARY OF THE INVENTION

It is an object of this invention to provide a pluggable coupling which is easy to operate and, in particular, which can be coupled or locked and unlocked with a minimal expenditure of force as compared to conventional pluggable couplings. It is another object of this invention to provide a pluggable coupling in which the wear of the coupling element is reduced thereby extending the service life of the pluggable coupling beyond the service life of conventional couplings.

The above-mentioned and other objects of this invention are achieved in a pluggable coupling for pressure lines having a male coupling connector and a female coupling connector. The female coupling connector has two axially aligned connecting bores with different diameters and an annular groove formed between a wall surrounding a larger bore and a nipple surrounding a smaller bore, wherein the male coupling connector can be sealingly inserted into the annular groove.

BRIEF DESCRIPTION OF THE DRAWINGS

The above-mentioned and other features of this invention will become more apparent when viewed in conjunction with the drawings wherein:

FIG. 1 is a side cross-sectional view of a female coupling connector and a male coupling connector for a pluggable coupling in accordance with one embodiment of this invention;

FIG. 2 is a side cross-sectional view of a female coupling connector and a male coupling connector for a pluggable coupling in accordance with another embodiment of this invention;

FIG. 4A is a side view of a housing for a pluggable coupling in accordance with one embodiment of this invention;

FIG. 4B is a cross-sectional view of the housing taken along line 4B—4B as shown in FIG. 4A also showing a blocking member in accordance with one embodiment of this invention; and FIG. 4C is an enlarged view of a portion of the housing and blocking member shown in FIG. 4B showing the details of a pin employed for retaining the blocking member within the female coupling connector of a pluggable coupling in accordance with one embodiment of this invention.

DESCRIPTION OF PREFERRED EMBODIMENTS

Figure 3:
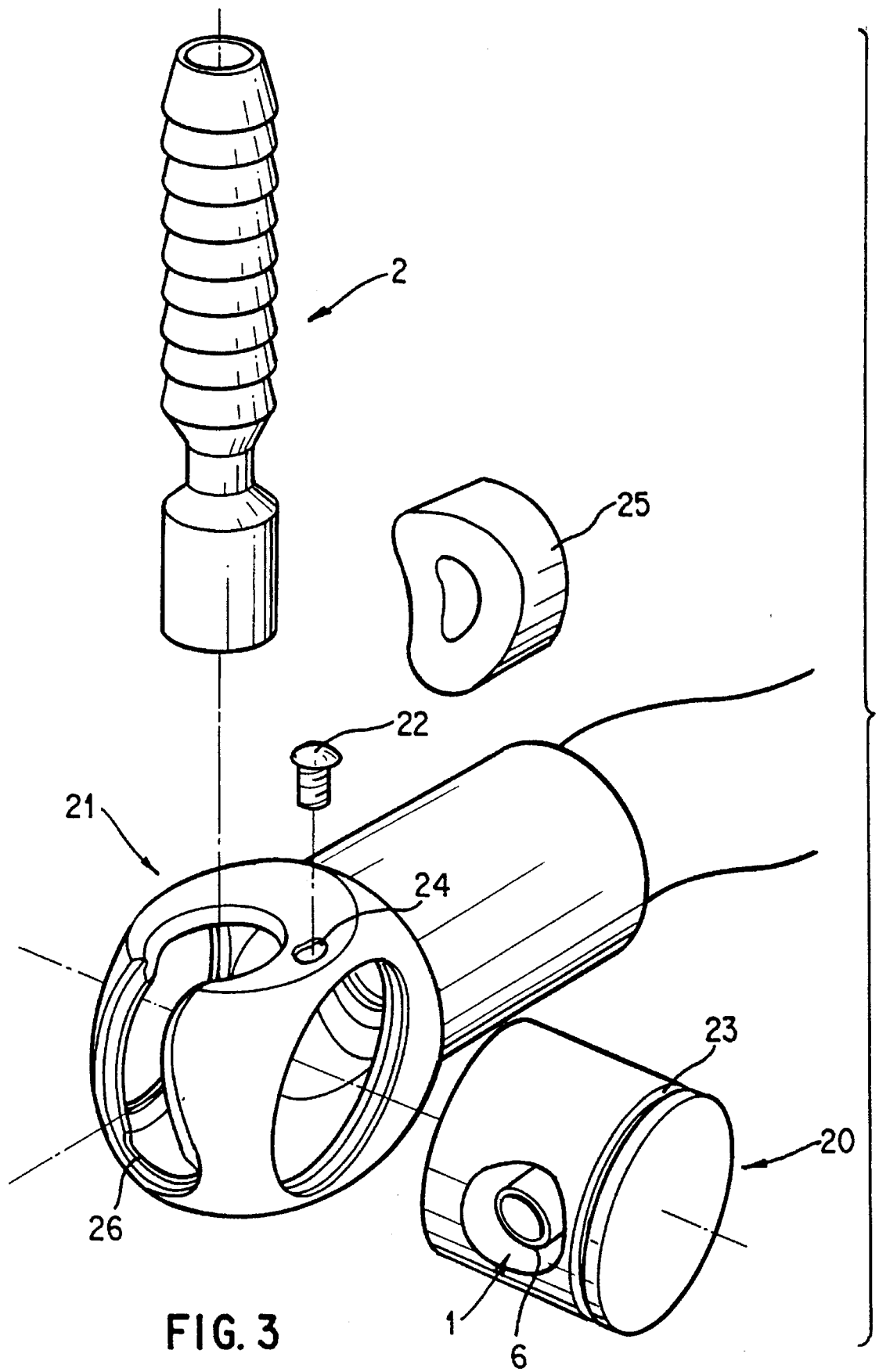
FIG. 3 is an exploded view of a pluggable coupling having a pivotable blocking member in accordance with one embodiment of this invention.

FIG. 1 shows the female coupling connector 1 and the male coupling connector 2 of a pluggable coupling in accordance with one embodiment of this invention. Here, the female coupling connector 1 is embodied as a pivotable blocking member which can be inserted in a housing of a pivot coupling. Female couplings used in linear couplings according to other embodiments of this invention have a different exterior shape. The interior shape of the female coupling connector 1 is an important aspect of this invention. As shown in FIG. 1, the female coupling connector 1 has two axially aligned connecting bores 3, 4 with different diameters. An annular groove 5 is formed between a female coupling connector wall surrounding a larger bore 3 and a nipple 6 surrounding a smaller bore 4. The width and depth of the annular groove 5 are selected so that the male coupling connector 2 can be seated in the annular groove 5. The exterior diameter of the nipple 6 surrounded by the annular groove 5 and the smaller bore 4 should be as small as possible, because this diameter determines the effective cross-sectional area which, together with the pressure in the interior of the coupling, determines the force required to push the male connector 2 into the female connector 1. Thus the wall thickness of the nipple 6 should be as thin a possible at a defined flow-through cross section, which is determined by the interior diameter of the bore 4. As shown in FIG. 1, the nipple 6 has a sealing face 7 with a smooth exterior surface. A male coupling sealing element 9, which may be an O-ring, is positioned within a circular male coupling groove 12. When plugging the coupling elements 1, 2 together, the male connector 2 is inserted into the bore 3 of the female coupling connector 1 so that the male coupling sealing element 9 located in the circular groove 12 of the male connector 2 is positioned over the nipple 6 thereby creating a seal. Pressure is exerted on the entire cross-sectional surface of the male connector 2 until the male coupling sealing element 9 has reached the sealing face 7.

After the male coupling sealing element 9 has been pushed on the nipple 6, pressure is only exerted on exposed surface 18 of the male connector 2 which is positioned beyond the seal 19. Thus, the cross-sectional area of the male coupling connector 2 exposed to pressure is considerably reduced. So that the fluid present in the annular groove 5 can escape when the male connector 2 is inserted, one or more relief bores 19 are formed into the female connector coupling wall and lead from the annular groove 5 to an exterior area surrounding the female coupling connector 1.

FIG. 2 shows another embodiment of this invention in which a nipple sealing element 10 is positioned in a circular groove 13 of the nipple 6. An inside surface 11 of a male coupling wall surrounding a coupling bore 8 of the male coupling connector 2 forms a sealing face.

Thus, in a preferred embodiment according to this invention the shape of the female connector 1 and the associated male connector 2 reduces the cross-sectional surface area on which pressure acts during coupling and uncoupling without reducing the cross-sectional flow area which is defined by the diameter of the nipple bore 4 of the female connector 1 and the diameter of the male bore 15 of the male connector 2. The diameter of the cross-sectional surface area on which the pressure of the fluid acts corresponds to the interior diameter of the opening 14 of the male connector 2. In conventional male connectors, the sealing element of the coupling is located between the outside surface 16 of the male coupling connector 2 and the inside 17 surface of the bore 3 of the female coupling connector 1. The cross-sectional area on which the pressure of the fluid acts in this case is defined by the diameter of the bore 3 of the female coupling connector 1. In a pluggable coupling according to this invention, a reduction of the expenditure of force required to push the male coupling connector and the female coupling connector together is accomplished by removing the cross-sectional area between the diameter of the opening 14 and the diameter of the bore 3 from the area on which the pressure of the fluid acts.

A further advantage of the pluggable coupling shown in FIG. 1 and FIG. 2 over conventional couplings is that the seal as well as the sealing surface are located on the inside and are thus protected from harmful elements, and therefore are subject to considerably less exterior mechanical wear, which leads to increased sealing and increased operational dependability of connected machinery and to an extension of the service life of the coupling.

FIG. 3 shows one embodiment of a pluggable coupling for pressure lines in accordance with this invention, wherein the female coupling connector 1 is disposed in the interior of a pivotable blocking member 20. Here the coupling is shown in an exploded view. The one-piece blocking element 20 is sealingly seated in a housing 21 by seal 25 and is secured therein with a grooved drive stud 22. In an assembled state, the seal 25 is positioned in the housing 21 and has a curved sealing face which sealingly rests against the exterior of the blocking member 20. The grooved drive stud 22 is placed inside a bore 24 of the housing 21 and engages an annular groove 23 in the blocking member 20. The coupling can be brought from a blocking position into a conducting position by inserting the male coupling connector 2 into the female coupling connector 1 and pivoting the blocking member 20. As soon as the male connector 2 is aligned with the housing, it is pushed slightly out of the female connector 2 into a recess 26 of the coupling housing 21 by the pressure in the pressure line and is locked into this position. In this position, the male coupling connector 2 and the blocking member 20 in which it is inserted can no longer be pivoted and the coupling is locked. To unlock the pluggable coupling it is necessary to push the male connector 2 slightly toward the female connector 1 out of the recess 26 thereby releasing the blocking member 20 for pivoting. In pressure lines with large line diameters and high pressures, the force required to push the male coupling connector 2 towards the female coupling connector 1 is considerably reduced. The male coupling connector 2 is then pivoted along with the blocking member 20, bringing the blocking member 20 into a blocking position. In the process the bore leading through the blocking member 20 passes over a relief bore of the housing 1 on a side of the housing 1 facing away from the male connector 2 which equalizes the pressure between the environment and the interior of the male coupling connector 2. Finally, in a completely pivoted blocking position of the blocking member 20 it is possible to pull the male coupling connector 2, which is no longer under pressure, out of the female coupling connector 1. Thus, in a pluggable coupling according to this invention unlocking the pluggable coupling with a pivotable blocking member can be performed with a considerably reduced amount of force, compared with the force required in conventional couplings.

One embodiment of the pluggable coupling with a pivotable blocking member in accordance with this invention is illustrated in FIGS. 4A–4C. The female coupling connector 1 is formed as one piece with the blocking member 20 which is seated in a coupling housing 21.

The blocking member 20 can be pivoted into a conducting, a pressure-relieving and a blocking position 27 by pivoting the connected male coupling connector 2. The blocking member 20 can be secured in each one of these positions. The blocking member 20 can be unlocked by pressing a pushbutton on the housing 21 and pivoted into an appropriate position for uncoupling. According to one embodiment of this invention a spring-loaded pin 28 is positioned in a housing bore 30 and protrudes through the housing 21 in a radial direction in relation to the pivotable blocking member 20. The spring-loaded pin 28 has a thickened dovetail end 32 which is positioned in a groove 29 in the blocking member 20 which extends around a portion of a circumference of the blocking member 20. The groove 29 in the blocking member 20 has recesses 31 in the radial direction in respect to the blocking member 20 at the blocking positions 27, into which the thickened dovetail end 32 of the pin 28 fits. When the blocking member 20 is pivoted so that the male coupling connector 2 is disposed at a blocking position 27, the thickened dovetail end 32 of the spring-loaded pin 28 engages the recess 31 in an interlocking manner and is maintained in this position by the force of spring-loaded pin 28. In this way the blocking member 20 is locked into position and can only be pivoted out of this position into another position by pushing the spring-loaded pin 28 toward the blocking member 20.

I claim:

1. In a pluggable coupling for pressure lines comprising a male coupling connector (2) and a female coupling connector (1), the improvement comprising: the female coupling connector (1) forming two axially aligned bores (3, 4) of different diameters in communication with each other, and forming an annular groove (5) with a groove outer diameter substantially equal to the diameter of the larger bore around the bore of lesser diameter (4) and with an inner diameter slightly larger than the bore of lesser diameter (4) whereby a nipple (6) having a minimal wall thickness is formed, the male coupling connector (2) sealingly insertable into the annular groove (5), and said female connector (1) having at least one relief bore (19) extending from a bottom of said annular groove (5) to the exterior of said female connector (1).

2. In a pluggable coupling for pressure lines in accordance with claim 1, wherein the nipple (6) enclosed by the annular groove (5) comprises a smooth sealing face (7) on an exterior surface, and said male coupling connector (2) comprises a male coupling connector sealing element (9) located in an interior (8) of the male coupling connector (2).

3. In a pluggable coupling for pressure lines in accordance with claim 1, wherein the nipple (6) enclosed by the annular groove (5) forms a circular groove into which a nipple sealing element (10) is inserted, and an interior (8) of the male coupling connector (2) is a smooth male coupling connector sealing face.

4. In a pluggable coupling for pressure lines in accordance with claim 1 further comprising at least one sealing element (9, 10) inserted into one of an external circumferential groove (13) formed on an exterior surface of said nipple (6) and an interior circular groove formed on an interior sealing surface of said male coupling connector.

5. In a pluggable coupling for pressure lines in accordance with claim 1, wherein the female coupling connector (1) is disposed in an interior of a pivotable blocking member (20), said blocking member (20) sealingly seated in a housing (21) and with the male connector (2) inserted in it pivoted between a conducting position and a blocking position.

6. In a pluggable coupling for pressure lines in accordance with claim 5, wherein the female coupling connector (1) and the blocking member (20) are formed as one piece.

7. In a pluggable coupling for pressure lines in accordance with claim 1 further comprising a pivotable blocking member (20) disposed in a housing (21) and lockable in at least one pivot position by a spring-loaded pin (28) projecting through the housing (21) radially in respect to the pivotable blocking member (20), said spring-loaded pin (28) comprising a thickened end (32) disposed in a form-fitting manner in a corresponding blocking member groove (29), extending around a portion of the circumference, formed by the blocking member (20) and having a plurality of recesses (31) in a radial direction in respect to the blocking member (20) the thickened end (32) is arrested under spring-loading in the recesses (31).

8. In a pluggable coupling for pressure lines in accordance with claim 5, wherein the blocking member (20) is cylindrical and is secured in the housing (21) in an axial direction by engagement of a grooved driving stud (22) in a circular groove (23) formed by the blocking member (20) through the housing (21).

9. In a pluggable coupling for pressure lines in accordance with claim 4 further comprising a blocking member (20) lockable in at least one pivot position by a pin (28) which engages a bore (30) formed by the blocking member (20) through the housing (21).

10. In a pluggable coupling for pressure lines in accordance with claim 4, wherein the female coupling connector (1) is disposed in an interior of a pivotable blocking member (20), said blocking member (20) sealingly seated in a housing (21) and with the male connector (2) inserted in it pivoted between a conducting position and a blocking position.

11. In a pluggable coupling for pressure lines in accordance with claim 10, wherein the female coupling connector (1) and the blocking member (20) are formed as one piece.

12. In a pluggable coupling for pressure lines in accordance with claim 11, wherein the pivotable blocking member (20) is disposed in the housing (21) and lockable in at least one pivot position by a spring-loaded pin (28) projecting through the housing (21) radially in respect to the pivotable blocking member (20), said spring-loaded pin (28) comprises a thickened end (32) disposed in a form-fitting manner in a corresponding blocking member groove (29), extending around a portion of the circumference, formed by the blocking member (20) and having a plurality of recesses (31) in a radial direction in respect to the blocking member (20) the thickened end (32) is arrested under spring-loading in the recesses (31).

13. In a pluggable coupling for pressure lines in accordance with claim 6, wherein the blocking member (20) is cylindrical and is secured in the housing (21) in an axial direction by engagement of a grooved driving stud (22) in a circular groove (23) formed by the blocking member (20) through the housing (21).

14. In a pluggable coupling for pressure lines in accordance with claim 11, wherein the blocking member (20) is cylindrical and is secured in the housing (21) in an axial direction by engagement of a grooved driving stud (22) in a circular groove (23) formed by the blocking member (20) through the housing (21).

* * * * *